United States Patent
Nowoczynski et al.

(10) Patent No.: US 8,316,288 B2
(45) Date of Patent: Nov. 20, 2012

(54) HIGH EFFICIENCY, HIGH PERFORMANCE SYSTEM FOR WRITING DATA FROM APPLICATIONS TO A SAFE FILE SYSTEM

(75) Inventors: Paul Nowoczynski, Pittsburgh, PA (US); Nathan Stone, Pittsburgh, PA (US); Jared Yanovich, Pittsburgh, PA (US); Jason Sommerfield, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 417 days.

(21) Appl. No.: 12/734,201

(22) PCT Filed: Nov. 7, 2008

(86) PCT No.: PCT/US2008/082794
§ 371 (c)(1),
(2), (4) Date: Apr. 16, 2010

(87) PCT Pub. No.: WO2009/062029
PCT Pub. Date: May 14, 2009

(65) Prior Publication Data
US 2010/0223539 A1   Sep. 2, 2010

Related U.S. Application Data

(60) Provisional application No. 61/002,479, filed on Nov. 9, 2001.

(51) Int. Cl.
*G06F 11/00* (2006.01)
(52) U.S. Cl. ...................................... 714/801
(58) Field of Classification Search ................... 714/801
See application file for complete search history.

(56) References Cited

U.S. PATENT DOCUMENTS

| | | | |
|---|---|---|---|
| 5,163,131 A | 11/1992 | Row et al. | |
| 5,832,198 A | 11/1998 | Lucht | |
| 5,996,088 A | 11/1999 | Frank et al. | |
| 7,519,636 B2 | 4/2009 | Strahl et al. | |
| 7,593,975 B2 | 9/2009 | Edwards et al. | |
| 2008/0256427 A1* | 10/2008 | He et al. | 714/801 |
| 2009/0249173 A1* | 10/2009 | Torigoe et al. | 714/801 |
| 2010/0023847 A1* | 1/2010 | Morita et al. | 714/801 |
| 2011/0145535 A1* | 6/2011 | Kusama et al. | 711/170 |

OTHER PUBLICATIONS

Abbasi et.al., "Extending I/O through High Performance Data Services," Cluster Computing, Austin, TX, IEEE International, Sep. 2007.

(Continued)

*Primary Examiner* — Bryce Bonzo
(74) *Attorney, Agent, or Firm* — K&L Gates LLP

(57) ABSTRACT

Systems and methods for increasing the efficiency of data storage processes for high performance, high core number computing systems. In one embodiment, the systems of the present invention perform sequential I/O whenever possible. To achieve a high degree of sequentiality, the block allocation scheme is determined by the next available block on the next available disk. This simple, non-deterministic data placement method is extremely effective for providing sequential data streams to the spindle by minimizing costly seeks. The sequentiality of the allocation scheme is not affected by the number of clients, the degree of randomization within the incoming data streams, the logical byte addresses of incoming request's file extents, or the RAID attributes (i.e., parity position) of the block.

18 Claims, 3 Drawing Sheets

OTHER PUBLICATIONS

Stone et al., "PDIO: High-Performance Remote File I/O for Portals-Enabled Compute Nodes," Proceedings of the 2006 Conference on Parallel and Distributed Processing Techniques and Applications, Las Vegas, NV, Jun. 2006.

Nowoczynski et al., "Zest: Checkpoint Storage System for Large Supercomputers," Proceedings of the 2008 ACM Petascale Data Storage Workshop (PDSW 08) (2008).

Arpaci-Dusseau et al., "Cluster I/O with River: Making the Fast Case Common," Proceedings of the 6th Workshop on I/O in Parallel and Distributed Systems, pp. 16-22, May 1999, Atlanta, GA.

Written Report mailed Jan. 21, 2009 in PCT Application No. 2008/82794 (5 pages).

PCT International Preliminary Report on Patentability for International Application No. PCT/US 2008/082794, filed Nov. 7, 2008, mailed May 20, 2010.

* cited by examiner

HIGH EFFICIENCY, HIGH PERFORMANCE SYSTEM FOR WRITING DATA FROM APPLICATIONS TO A SAFE FILE SYSTEM

PRIORITY CLAIM

The present application claims priority to U.S. provisional patent application Ser. No. 61/002,479, filed Nov. 9, 2007, which is incorporated herein by reference in its entirety.

STATEMENT REGARDING FEDERALLY-SPONSORED RESEARCH

The invention was made with partial government support from the U.S. National Science Foundation under Grant No. SCI-0456541. The U.S. government has certain rights in this invention.

BACKGROUND

Computational power in modern High Performance Computing (HPC) platforms is rapidly increasing. Moore's Law alone accounts for the doubling of processing power roughly every 18 months. A historical analysis of the fastest computing platforms in fact shows a doubling of compute power in HPC systems roughly every 14 months, with the first petaflop computing platform occurring in 2008. This accelerated growth trend is due largely to an increase in the number of processor cores in HPC platforms; the current fastest computer has roughly 265,000 cores. An increase in the number of cores imposes two types of burdens on the storage subsystem: (1) larger data volume and (2) more requests. The data volume increases because the physical memory per core is generally kept balanced, resulting in a larger aggregated data volume, typically on the of order petabytes for petascale HPC systems. More cores, however, also means more file system clients, more input/output (I/O) requests to the storage servers, and ultimately more seeking at the back-end storage media while storing that data. This results in higher observed latencies and lower performance.

HPC sites typically implement parallel file systems to optimize the I/O subsystem for checkpointing. Checkpointing is a procedure, executed from time to time on a HPC node, where the current state of an application is stored, typically on a disk-based storage system. Checkpointing, which involves periodic, heavy bursts of data followed by long latent periods, is the dominant I/O activity on most HPC systems. Because compute performance is greatly outpacing storage performance, storage systems are consuming an increasing percentage of the overall HPC machine budget. Consequently, storage systems now comprise an increasing number of distributed storage nodes. In the current environment, however, disk bandwidth performance greatly lags behind that of CPU, memory, and interconnects. This means that as the number of cores continues to increase and outpace the performance improvement trends of storage devices, disproportionaly larger and larger storage systems will be necessary to accommodate the equivalent I/O workload.

Typically, large parallel storage systems expose only a portion of their aggregate spindle bandwidth to the application being executed by an HPC system. Optimally, the only bandwidth loss in the storage system would come from redundancy overhead. In practice, however, the modules in HPC systems used to compose parallel storage system attain less than 50%, and around 40%, of their aggregate spindle bandwidth. These are several possible reasons for this: (1) the aggregate spindle bandwidth is greater than the bandwidth of the connecting bus; (2) the raid controller's parity calculation engine output is slower than the connecting bus; and (3) sub-optimal LBA (logical block addressing) request ordering caused by the filesystem. The first two factors are direct functions of the storage controller and may be rectified by matched input and output bandwidth from the host to disk. The last factor, which is essentially the "seek" overhead, is more difficult to overcome because of the codependence of the disk layer and filesystem on the simple linear block interface. The raid layer further complicates matters by incorporating several spindles into the same block device address range and forcing them to be managed in strict unison.

Since the data storage process ties up the compute nodes, the computational application is not running during this storage process, which reduces the net operational time of the computing system. HPC systems must have data stored frequently for recovery to avoid the potential loss of data due to overall system instability, or for post processing. The downtime in computational application operations that is associated with the data storage process creates a significant drain on the overall operations of the computing system.

Many parallel file systems address this problem by increasing the number of distributed storage nodes and making the data placement on disk more predictable, concentrating on the effective channeling of data to its final destination. This approach of increasing the number of storage nodes adds significant costs to the overall computing system.

In addition, today's parallel I/O infrastructures typically use two inferential systems for data storage that inhibit improvements in spindle bandwidth. They are: (1) object-based parallel file system metadata schema and (2) block-level RAID parity group association. Object-based parallel file systems use file-object maps to describe the locations of a file's data. These maps are key components to the efficiency of the object-storage method because they allow for arbitrary amounts of data to be indexed by a very small data structure composes merely of an ordered list of storage servers and a stride. In essence, the map describes the location of the file's sub-files and the number of bytes that may be accessed before proceeding to the subfile or stripe. Besides the obvious advantages in the art of metadata storage, there are several caveats to this process. The most obvious is that the sub-files are the static products of the object metadata model that was designed with its own efficiency in mind. The result is an overly deterministic data placement method that, by forcing I/O into a specific sub-file, increases complexity at the spindle because of the backing filesystem's block allocation schemes cannot guarantee sequentiality in the face of thousands or millions of simultaneous I/O streams.

RAID systems infer that every same-numbered block within the respective set of spindles are bound together to form a protected unit. This method is effective because only the address of a failed block is needed to determine the location of its protection unit "cohorts" with not further state being stored. Despite this inferential advantage, strict or loose parity clustering can be detrimental to performance because it pushes data to specific regions on specific disks.

SUMMARY

In one general aspect, the present invention is directed to systems and methods for increasing the efficiency of data storage processes for high performance, high core number computing systems. In the age of petascale compute systems, where disk speeds are greatly outpaced by the performance of CPU's and the speed of high-performance networks, maintaining sequentiality at the spindle is the most effective method of providing a scalable, cost-effective checkpoint I/O system. In one embodiment, the systems of the present invention perform sequential I/O whenever possible. To achieve a high degree of sequentiality, the block allocation scheme is not determined by data offset or the file object identifier, but rather by the next available block on the disk. This simple, non-deterministic data placement method is extremely effective for providing sequential data streams to the spindle by minimizing costly seeks. The sequentiality of the allocation scheme is not affected by the number of clients, the degree of randomization within the incoming data streams, the logical byte addresses of incoming request's file extents, or the RAID attributes (i.e., parity position) of the block. It should be noted that a block's parity position does restrict the number of disks that may handle it. This is the only determinism maintained in the write process in various embodiments.

Unlike current data storage processes, which tie up the computational cores throughout the whole data storage and formatting processes, embodiments of the present invention permit the computational cores to be freed up more quickly by offloading some of the data storage and formatting processes to the servers that write the data to the disks. Because the computational cores can be freed up more quickly than in conventional approaches, embodiments of the present invention solve an important bottleneck that is growing in significance as the number of computing cores and aggregate system memory size increase. System operators typically wish to perform data storage processes in a three- to five-minute timeframe. The process consists of writing upwards of 90% of the total system memory to magnetic storage. This goal is infeasible as high performance computers approach and surpass the petabyte scale because the cost of the storage system dominates the budget for the overall system. The general approach of the current invention is to send fragmented and partially unformatted data to storage, and to utilize the storage system servers, rather than the computational cores, to defragment and format the data in the background, while the computational cores are freed to return to running an application.

In various embodiment, the data storage process of the present invention involves sending application data to the permanent file system through a series of three stages: (1) a client library handles the application's I/O calls and uses a novel buffer management technique to prepare the data for transmission to the next stage; (2) a data stream management system runs on a server with locally attached disks and writes data in fixed size fragments to the next available disk block; and (3) the fragmented data is then reconstructed into a file system by the storage servers, which frees the computational cores of the HPC node to return to running the application.

In various implementations, computing platform according the present invention may comprise (1) a compute node and (2) a storage server cluster in communication with the compute node. The compute node may comprise multiple processing cores for executing an application and multiple vector-based cache buffers. Data from I/O calls from execution of the application are aggregated in the cache buffers according to a plurality of parity groups. The storage server cluster may comprise a plurality of I/O servers, wherein each I/O server is connected to and controls a plurality of disk drive data storage systems. Data in the cache buffers is transmitted from the compute node to at least one of the I/O server servers of the storage server cluster and stored in queues on the I/O server. The disk drives data storage systems then write the data from the queues sequentially in data fragments to disks of the disk drive data storage systems such that data fragments of differing parity groups are not written on the same disk.

In various implementations, the I/O servers are programmed to reconstruct the data fragments in a filesystem that is stored on the disks. In addition, each I/O server may write the data fragments from the queues of the I/O server to a next available disk block of the disk drive data storage systems of the I/O server. Each I/O server may comprise a plurality of threads, wherein each thread controls write operations for one disk of the plurality of disk drive data storage systems of the I/O server. Preferably, data fragments from the queues are written to outer tracks of the disks and reconstructed data fragments in the filesystem are written to inner tracks of the disks.

Additionally, the compute node may be programmed to calculate parity for data transmitted to the storage server cluster and to perform a checksum on data aggregated in the cache buffers.

Further aspects of the present invention will be described in greater detail below.

FIGURES

Various embodiments of the present invention are described herein by way of example in conjunction with the following figures, wherein.

DESCRIPTION

Figure 1:
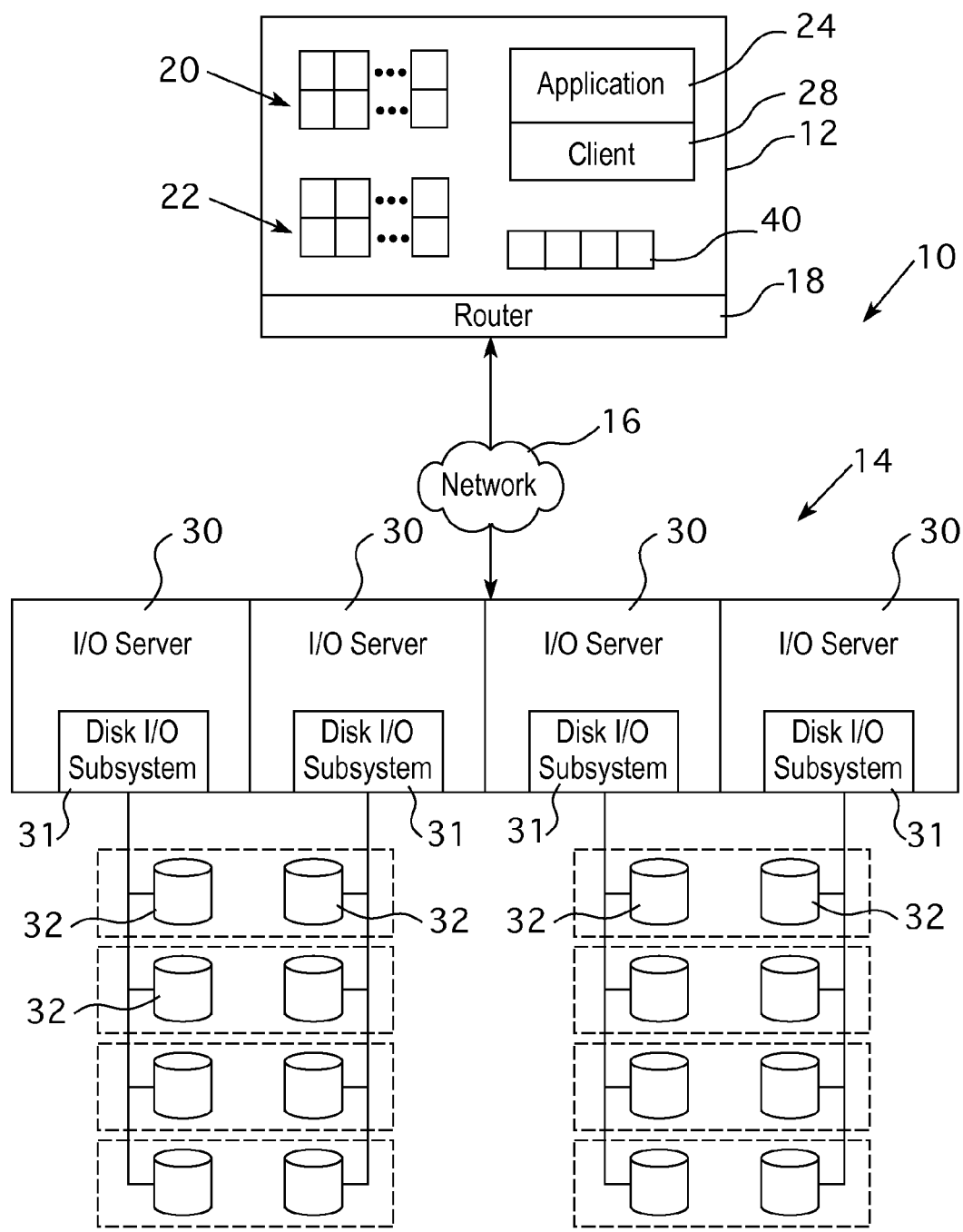
FIG. 1 is a simplified block diagram of a computing platform according to various embodiments of the present invention.

FIG. 1 is a diagram of a high performance computing (HPC) platform 10 according to various embodiments of the present invention. As shown in FIG. 1, the HPC platform 10 comprises a compute node 12 in communication with a storage server cluster 14 via a data network 16. The compute node 12 may be a supercomputer, comprising a number of processor cores 20 and a number of memory units 22, such as DRAM. In one embodiment, each core 20 may have its own group of one or more memory units 22 and may have its own operating system. In other embodiments, a number of the cores 20 may share a common operating system. In one embodiment, the compute node 12 may comprise a distributed memory, massively parallel MIMD (Multiple Instruction stream, Multiple Data stream) supercomputer, such as a Cray XT3 supercomputer.

The processor cores 20 may execute one or more software computational applications 24. As is common in distributed shared memory systems, periodic or time-to-time checkpointing operations may be employed. In such checkpointing operations, data from the then current application state is stored, in this case at the storage cluster center 14, according to a process described more fully below.

As shown in FIG. 1, the storage cluster center 14 may comprise a number of I/O storage servers 30. Each I/O storage server 30 may comprise a disk I/O subsystem 31 that controls a number of disk drive data storage systems 32. The servers 30 may be in communication with the disk drive storage systems 32 via SAS (Serial Attached SCSI) links. The disk drive storage systems 32 may comprise SATA disk drives. As shown in the example of FIG. 1, each I/O storage server 30 may have four (4) primary disk drive data storage system 32 to which the I/O storage server 30 can write data, although in other embodiments, the I/O storage servers 30 may control a different number of disk drive data storage systems 32. In addition, as shown in FIG. 1, each I/O storage server 30 may be in communication with the disk drive data storage systems 32 of another I/O storage server 30. In one embodiment, the I/O storage servers 30 may be able to read data from such secondary disk drive data storage systems 32, but not able to write data when both systems are active. In one embodiment, the servers 30 may comprise multi-core, InfiniBand-connected Linux hosts.

Each disk drive data storage system 32 may comprise one or more rotatable data storage disks (or platters). Each disk may have an associated head (or spindle) that is capable of writing binary data to the disks and reading the data from the disks. The disks preferably are magnetic data storage disks with a constant angular velocity. In disk drive parlance, seeking is the process where the head moves to a particular area of the disk for a read or write operation. As described herein, one of the purposes of this invention is to reduce or minimize the seek times of the heads when writing data from the applications running on the compute node 12 to the disks of the disk drive data storage systems 32. To accomplish this in one embodiment, data may be initially written in fragments to tracks on the outer portion of the disks, where the head covers more area per unit time. Once the data is written, it may be reconstructed in a filesystem stored on the inner tracks of the disk, as described further below.

In one embodiment, the I/O storage servers 30 serve as both a storage controller for the disk drive data storage systems 32 and as a file server. The I/O storage servers 30 may manage I/O to each disk drive data storage systems 32 as a separate device. That is, I/O is not done into a virtual lun of multiple disks or volumes, but rather to each disk. Typically, enterprise class storage systems aggregate groups of disks for the purpose of redundancy via a RAID mechanism. The result of the aggregation is a singular address space, which spans the constituent disks. Since embodiments of the present invention do not rely on this form of RAID protection, it is able to use the disk drives in a decoupled fashion.

In one embodiment, the HPC platform 10 may employ a file system based on the Lustre file system. In that connection, the network 16 interconnecting the compute node 12 and the storage server cluster 14 may be implemented using Lustre Networking (LNET). In addition, the compute node 12 may comprise a LNET router 18 connecting to the network 16.

Returning to the compute node 12, it may also comprise a number of buffers 40. In addition, the compute node 12 may comprise a client 28 that is part of and compiled with the computational application 24. The client 28 may intercept I/O calls by the processor cores 20 when executing the application(s) 24. For example, the client 28 may intercept standard UNIX I/O calls, such as OPEN and WRITE. When the application write requests are smaller than the size of the buffers 40, the data to be written is stored in one of the buffers 40. When the size of the write request is larger than the buffer size, the client 28 may send the data directly to the storage server cluster 14 for storage. In various embodiments, the buffers 40 can hold any offset within the respective file, though a maximum number of fragments (vectors) per buffer 40 may be enforced. The maximum may be based on the number of I/O vectors that can be stored in the metadata region of a block on the disks. In one embodiment, the maximum may be sixteen (16), meaning that a buffer 40 may be written to until either its capacity is consumed or the maximum number of fragments has been reached.

In various embodiments, rather than using page-based buffers, as are used in most filesystem caches, the buffers 40 may be vector-based write buffers. Consequently, in such embodiments, no global page lock is needed to ensure the update atomicity of a page. This method provides properties critical to the facilitation of sequentializing disk-bound data streams. Prior art systems, typically used for HPC checkpoint storage, depend on the update atomicity of an aligned, smallest-unit of data called a "page." To enable atomic operations on pages, the stored location of any given page within the system must made known to all agents participating in the system activities. The result of such a design is that the storage address of these pages is determined by a globally known algorithm, which all system agents use to find and lock pages. In terms of efficiency bandwidth, this prior art method, complicates the storage protocol because it is the primary determiner of the data's storage address. Hence, performance-based placement methods are precluded. Additional benefits come in the form of minimized network RPC (remote procedure call) overhead and the complexity of the I/O servers 30.

The compute node 12, executing the client 28, may perform parity calculations on its outgoing data stream and perform a checksum (e.g., a 64-bit checksum) on each buffer 40 and associated metadata. The results of these operations may be stored in a parity buffer 42. The data in the parity buffer 42 is also send to the storage server cluster 14 for storage. This allows for data reconstruction in the event of later data failures. Placing the parity generation and checksumming workloads on the compute node 12 distributes the workload across a large number of processing cores 20, saves the I/O storage servers 30 from requiring costly raid controllers, and increases the performance of the I/O storage servers 30. It should be noted that hardware RAID controllers most generally are not capable of exposing the aggregate bandwidth of its constituent disks. By placing the redundancy computational overhead onto the supercomputer the current invention bypasses this limitation.

Although only one compute node 12 is shown in FIG. 1, it should be recognized that in other embodiments, there may be additional compute nodes 12 in communication with the storage cluster server 14. In addition, rather than being part of the application 24, the client 28 may be a separate program that is executed by one or more of the cores 20.

Figure 2:
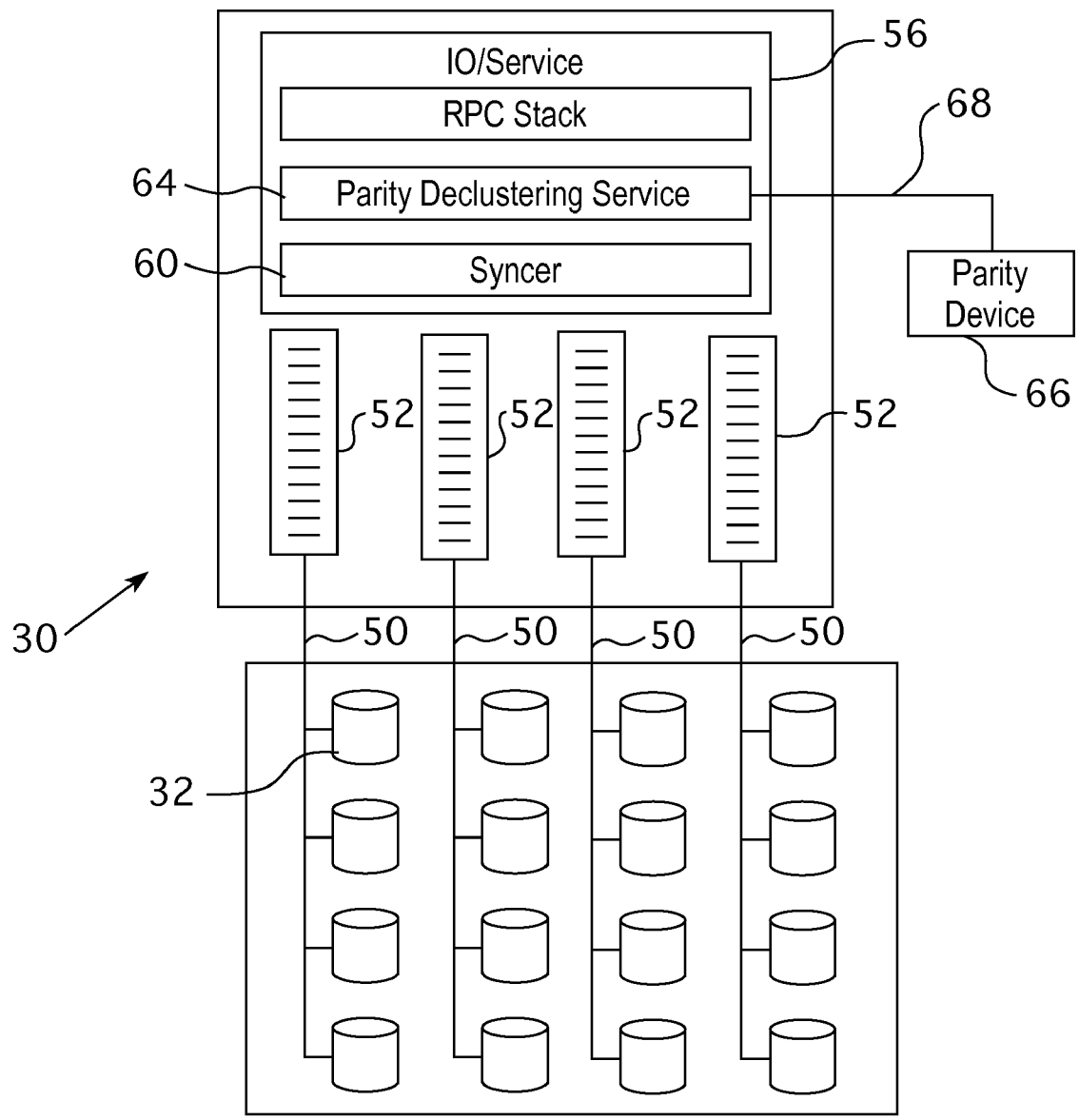
FIG. 2 is a simplified block diagram of an I/O server according to various embodiments of the present invention.

FIG. 2 is a simplified block diagram of an I/O server 30 of the storage server cluster 14 according to various embodiments of the present invention. In various embodiments, the I/O servers 30 may use modified version of the Lustre LNET and ptlrpc libraries. Ptlrpc provides a service layer that aids in the creation of multi-threaded network servers. The I/O servers 30 use this service layer to establish two RPC services for I/O and metadata. The I/O and metadata services may be groups of symmetric threads that process all client RPCs. The metadata RPCs may interface with the server's inode cache and with the namespace of the accompanying full-featured filesystems. An I/O service 56 may be responsible for pulling data buffers from the clients and passing them into the write processing queues, which are called raid "vectors" herein (see element 52 of FIG. 2).

Each I/O server 30 may assign one thread 50 for each valid disk in the associated disk drive data storage system 32. Each disk thread 50 preferably is the sole authority for its associated disk. The duties of the threads 50 may include: performing reads and writes; I/O request scheduling; rebuilding active data lost due to disk failure; freespace management and block allocation; tracking of bad blocks; and statistics keeping.

Each disk thread 50 may interact with its associated raid vectors 52. The raid vectors 52 are filled with data from the write buffers 40 by the Rpc stack 58 for the I/O servers 30, which appropriately place incoming buffers into their respective raid vectors 52. The disks may be assigned to raid vectors 52 based on their number. For example, for an I/O storage server 30 having sixteen (16) associated disks, a 3+1 RAID scheme could be used, using four raid vector queues 52, wherein disks [0-3] are assigned to queue 0, disks [4-7] are assigned to queue 1, and so on. Such a configuration allows for multiple disk drives to process write requests from a single queue 52, resulting in a pull-based I/O system, where incoming I/Os are handled by the disk drive data storage systems 32 ready to accept them. Disk drive data storage systems 32 that are slow would take less work and disk drive data storage systems 32 recognized as failed remove themselves from all raid vector queues 52. That way, the data is written sequentially to the next available disk block on the first available disk.

In order to be present on multiple raid vector queues 52, the disk threads 50 may have the ability to block simultaneously on multiple input sources. This capability allows for each disk thread 50 to accept write I/O requests on behalf of many raid schemes and read requests from the syncer subsystem 60 and the "strong parity declustering" service 64, as described further below.

The I/O storage servers 30 may also comprise a so-called syncer subsystem 60. In various embodiments, upon storing an entire parity group stream from the compute node 12, the completed parity group is passed into the syncer's work queue. From there, the syncer 60 issues a read request to each disk holding a member of the parity group. The disk threads 50 service this read request once all the write queues 52 are empty. Once the read I/O is completed, the read request handle is passed back to the syncer 60. From there, the data is written to a filesystem. When the entire parity group has been copied out, the syncer 60 instructs the disk threads 50 to schedule reclamation of the synced data blocks. In one embodiment, reclamation occurs only after all members of the parity group have been copied out.

The syncer 60 may perform a checksum on the data returned from the disks. This checksum protects the data and its associated metadata. In the event of a checksum failure, the block is scheduled to be rebuilt through a parity regeneration service. The checksum allows the system to verify data integrity without the use of its parity group peers.

In various embodiments, prior to being passed to the syncer 60, completed parity groups may be handed to a parity declustering service 64, where they are stored on a solid-state memory device ("the parity device") 66 according to various embodiments. Parity device addressing may be based on the disk and block numbers of the newly written blocks. Indexing the parity device 66 by disk and block number allows for inquiry on behalf of corrupt blocks where the only known information are the disk and block numbers. The parity group structure may be a few hundred bytes in size and list all members of the protection unit. For each member in the parity group, the structure may be copies to that member's respective parity device address.

During normal operation, the parity device 66 may be updated in conjunction with incoming writes in an asynchronous manner by a parity device thread 68. The operation is preferably asynchronous to minimize blocking in the disk I/O thread's main routine. As a result, the parity device 66 is not the absolute authority on parity group state in such an embodiment. Instead, the on-disk structures may have precedence in determining the state of the parity groups. At boot time, active parity groups may be joined by a group finding operation and the parity device 66 may be verified against this collection. In the event of a failed disk, the parity device 66 may be relied upon as the authority for the failed disk's blocks. In other embodiments, this fsck-like operation may be supplemented with a journal to minimize system startup times that are increased due to the filesystem check or fsck.

According to various implementations, as the client's write buffers 40 are consumed, they are placed into an rpc set and the I/O servers 30 are instructed to schedule the retrieval of the buffer. The rpc set may be a functional construct of the lustre ptlrpc library, which allows groups of semantically related rpc request to be managed as a single operation. Accordingly, the client 28 may assign an rpc set to each active parity group.

One advantage of employing non-deterministic data placement is that the client can send parity groups to any I/O server 30 within the cluster 14. A parity group is a set of equal size data blocks which are XOR'd with one another to produce a parity block where given N−1 data blocks and the parity block any single data block may be recomputed. That way, in the event of a failure of one of the I/O servers 30, the client 28 may resend an entire parity group to any other I/O server 30.

According to various embodiments, any parity stripe or group may be handled by any I/O server 30. The client 28 and the I/O servers 30 may communicate to determine which I/O server 30 is to handle a particular data stream from the client 28. That way, slow I/O servers 30 can be partially or fully bypassed.

In addition, as mentioned above, there may be one I/O thread 50 per disk. This exclusive access prevent thrashing. The I/O servers 30 may manage the scheduling for the threads 50 for data reconstruction requests, incoming writes, and reclamation activities, for example. The threads 50 may maintain free block maps for their associated disks and may write the data blocks to any address, which facilitates sequential access through non-determinism. The threads 50 may pull incoming data blocks from single or multiple raid vectors 52. Data blocks of differing relative parity positions preferably are not placed on the same disk, although data blocks from a particular raid vector 52 may be written to a number of different disks. The data blocks 52 may be pulled from the raid vectors 52 by the threads 50 as their associated disks are ready for writing. That way, slow devices preferably do less work and failed device are removed.

Because any parity group may be written to any I/O server 30, failure of a single I/O server does not create a hot spot in the storage network. Requests sent to the failed I/O server may be distributed evenly to other I/O servers 30 in the cluster 14. Moreover, writing parity groups to different I/O servers 30 permits checkpoint bandwidth partitioning on a per-job basis.

Figure 3:
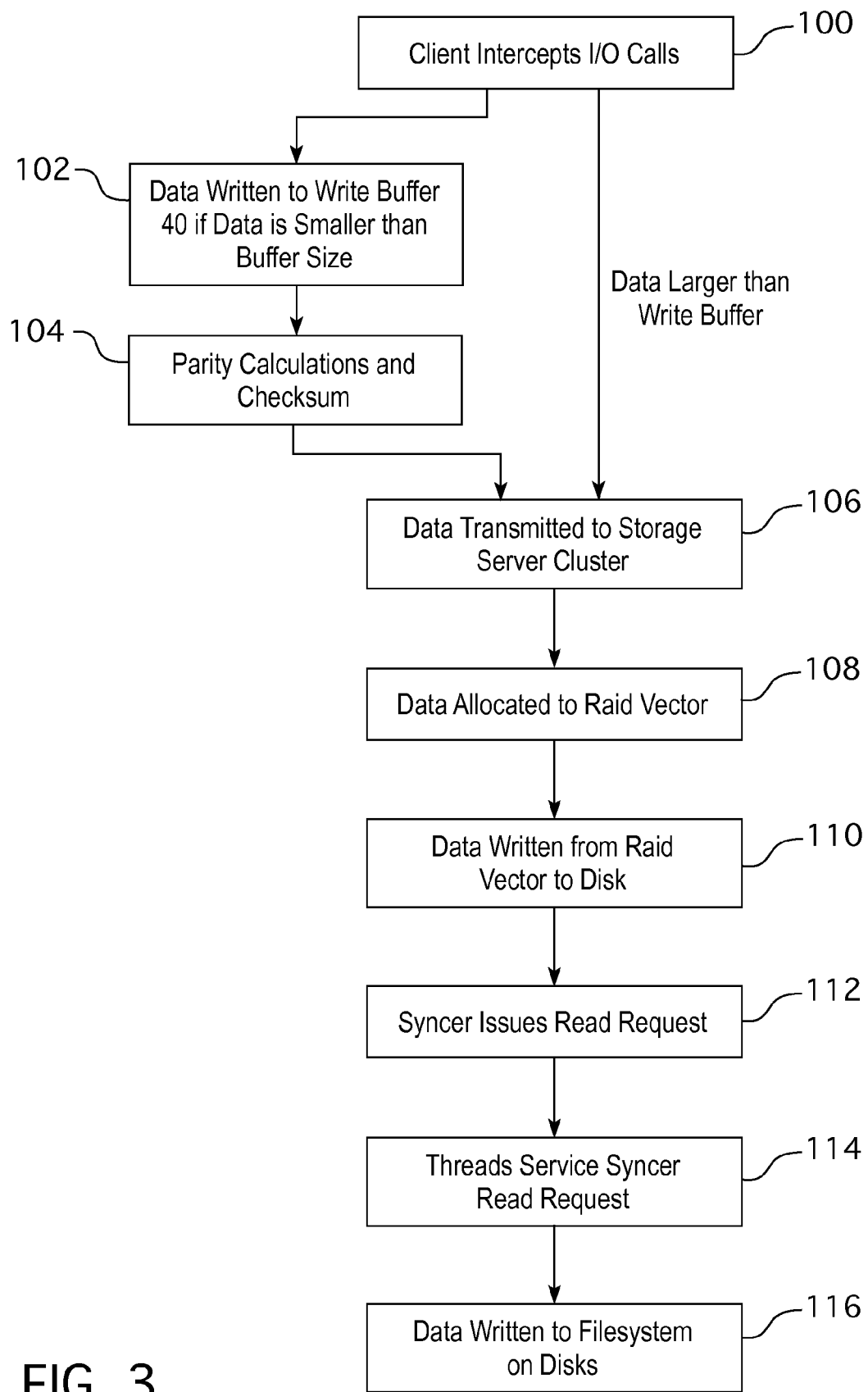
FIG. 3 is a flowchart of a process according to various embodiments of the present invention.

FIG. 3 is a diagram of a process according to various embodiments of the present invention. At step 100, the client 28 intercepts I/O calls made by the processor cores 20 during execution of the application 24. The I/O calls may be part of the normal operation of the computational application 24 or they could be part of a checkpoint operation. As mentioned above, in various embodiments, the client 28 may be compiled with the application 24, or the client 28 could be a separate program from the application. At step 102, if the write requests are smaller than the size of the buffers 40, the client 28 writes the data to the buffers 40. At step 104, when a buffer 40 is full and the buffer data is ready to be sent from the compute node 12 to the storage server cluster 14, the client 28 may (1) perform parity calculations on the going data stream and (2) perform a checksum on the buffer data and associated metadata. As mentioned above, a write buffer 40 may be considered full and ready to send when the buffer reaches the maximum number of data fragments (or vectors), which in one embodiment may be sixteen (16).

Next, at step 106, the buffer data is transmitted from the compute noted 12 to the storage server cluster 14 via the network 16 for storage on one of the I/O servers 30. The I/O servers 30 may allocate the data to one of the disk storage systems 32 for writing the data to a disk. Returning to step 100, if the data to be written as part of the I/O request is greater than the size of the buffers, the data may be sent directly to the storage server cluster 14.

At step 108, the data may be assigned (this should be changed in the diagram as well) to a raid vector 52 and then, at step 110, the data may be read from by one of the threads 50 and written to a data storage disk of one of the disk storage systems 32. As mentioned above, the data written during this phase preferably written to a track on the outer portion of the circular, rotating disk to exploit the increased rotational velocity there.

Next, at step 110, once a completed parity group is stored on the disks, the syncer 60 issues a read request to each disk holding a member or fragment of the parity group. At step 112, the threads 50 may service this read request once all the raid vectors 52 are emptied, which may occur between checkpoint operations. At step 114, once the read request is completed, the data is written to a filesystem. This may involve, in various embodiments, writing the data to the disks in a formatted filesystem in the interior tracks of the disks. That is, for example, at step 110, the data is written to the outer tracks on the disks, and at step 116 the data is written to interior tracks of the disks, i.e., tracks that are closer to the center of the disk than the outer tracks.

Preliminary performance tests involving systems of the present invention have been conducted. In the testing, a single 12-disk I/O server 30 and three clients 28, where each compute node 12 had eight xeon processor cores 20. In these tests, the disk drives of the I/O server were SATA-2 and operate at a sustained rate of 75 MB/s. Tests that measured only the disk I/O codepath measured a sustained back-end bandwidth of 868 MB/s or 96.4% of the aggregate maximum sustained rate, which compares favorably to prior art systems that typically realize less than 50% bandwidth.

The testing shows that in the best cases (using three clients), the end-to-end throughput of the I/O server according to embodiments of the present invention hovers around 90% of its aggregate spindle bandwidth. When using a RAID 7+1 parity scheme, which incurs a 12.5% overhead, the aggregate spindle bandwidth exposed to the application was about 80% (720 MB/s). Additionally, as measured in today's hardware costs, the price per megabyte of storage bandwidth with the current invention is close three times lower than other functionally analogous solution.

The invention provides many benefits. By focusing on performance-wise data placement rather than data placement schemes that are friendlier to today's filesystem metadata schemes, per-spindle efficiency can be increased. The increased efficiency reduces the required number of data storage systems. Therefore, for a given machine budget, more of the budget can be allocated to processor cores than to disk storage systems when embodiments of the present invention are used, thereby providing more powerful computational machines for the fixed budget. Embodiments of the present invention also eliminate the need for hardware RAID controllers typically placed in the I/O servers. In addition, the impact of many client connections, many I/O requests, and many file system seeks upon the backend disk performance is reduced by leveraging the performance strengths of each layer of the subsystem.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments.

It is to be understood that the figures and descriptions of the embodiments have been simplified to illustrate elements that are relevant for a clear understanding of the embodiments, while eliminating, for purposes of clarity, other elements. For example, certain operating system details for computer system are not described herein. Those of ordinary skill in the art will recognize, however, that these and other elements may be desirable in a typical processor or computer system. Because such elements are well known in the art and because they do not facilitate a better understanding of the embodiments, a discussion of such elements is not provided herein.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware, which may be used to implement embodiments, is not limiting. For example, embodiments described herein may be implemented in computer software using any suitable computer software language type. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computing platform comprising:
    a compute node comprising:
        multiple processing cores for executing an application; and
        multiple vector-based cache buffers, wherein data from I/O calls from execution of the application are aggregated in the cache buffers according to a plurality of parity groups;
    a storage server cluster in communication with the compute node, wherein the storage server cluster comprises a plurality of I/O servers, wherein each I/O server is connected to and controls a plurality of disk drive data storage systems, wherein:
        data in the cache buffers are transmitted from the compute node to at least one of the I/O server servers of the storage server cluster and stored in queues on the at least I/O server; and
        the disk drives data storage systems write the data from the queues sequentially in data fragments to disks of the disk drive data storage systems such that data fragments of differing parity groups are not written on the same disk.

2. The computing platform of claim 1, wherein the I/O servers are programmed to reconstruct the data fragments in a filesystem that is stored on the disks.

3. The computing platform of claim 1, wherein each I/O server writes the data fragments from the queues of the I/O server to a next available disk block of the disk drive data storage systems of the I/O server.

4. The computing platform of claim 3, wherein each I/O server comprises a plurality of threads, wherein each thread controls write operations for one disk of the plurality of disk drive data storage systems of the I/O server.

5. The computing platform of claim 4, wherein:
    data fragments from the queues are written to outer tracks of the disks; and
    reconstructed data fragments in the filesystem are written to inner tracks of the disks.

6. The computing platform of claim 5, wherein the compute node is programmed to calculate parity for data transmitted to the storage server cluster.

7. The computing platform of claim 6, wherein the compute node is further programmed to perform a checksum on data aggregated in the cache buffers.

8. The computing platform of claim 1, wherein the I/O servers are programmed to write data from each queue to two or more disk data storage systems.

9. The computing platform of claim 1, wherein the compute node comprises a supercomputer.

10. A method for storing data from a compute node, wherein the compute node comprises multiple processing cores for executing an application and multiple vector-based cache buffers, the method comprising:
    aggregating data from I/O calls from execution of the application in the cache buffers according to a plurality of parity groups;
    transmitting the data in the buffers to at least one I/O server of a storage server cluster that is in communication with the compute node, wherein each I/O server is connected to and controls a plurality of disk drive data storage systems
    storing the data transmitted from the compute node in queues on the at least I/O server; and
    writing the data from the queues sequentially in data fragments to disks of the disk drive data storage systems such that data fragments of differing parity groups are not written on the same disk.

11. The method of claim 10, further comprising reconstructing the data fragments in a filesystem that is stored on the disks.

12. The method of claim 10, wherein each I/O server writes the data fragments from the queues of the I/O server to a next available disk block of the disk drive data storage systems of the I/O server.

13. The method of claim 12, wherein each I/O server comprises a plurality of threads, wherein each thread controls write operations for one disk of the plurality of disk drive data storage systems of the I/O server.

14. The method of claim 13, wherein:
    data fragments from the queues are written to outer tracks of the disks; and
    reconstructed data fragments in the filesystem are written to inner tracks of the disks.

15. The method of claim 14, further comprising calculating parity for data transmitted to the storage server cluster at the compute node.

16. The method of claim 15, further comprising performing a checksum on data aggregated in the cache buffers at the compute node.

17. The method of claim 10, wherein data from each queue is written to two or more disk data storage systems.

18. The method of claim 10, wherein the compute node comprises a supercomputer.

* * * * *